United States Patent

[11] 3,587,873

| [72] | Inventor | Earl R. Lohneis<br>Milwaukee, Wis. |
|------|----------|-----|
| [21] | Appl. No. | 824,793 |
| [22] | Filed | May 15, 1969 |
| [45] | Patented | June 28, 1971 |
| [73] | Assignee | Kearney & Trecker Corporation<br>West Allis, Wis. |

[54] TOOL CHANGE MECHANISM FOR A MACHINE TOOL
4 Claims, 14 Drawing Figs.

[52] U.S. Cl. .................................................. 214/1BD, 29/568
[51] Int. Cl. .................................................. B23q 5/32
[50] Field of Search .......................................... 214/1 (R); 214/1 (B), 1(B3), 1 (B4), 1 (BS3), 1 (BS4), 147, 147 (G); 29/568

[56] References Cited
UNITED STATES PATENTS

| 3,300,856 | 1/1967 | Daugherty | 29/568 |
| 3,348,298 | 10/1967 | Sedgwich | 29/568 |

*Primary Examiner*—Gerald M. Forlenza
*Assistant Examiner*—George F. Abraham
*Attorneys*—Cyril M. Hajewski and Thomas A. Hauke ABSTRACT: A tool changer mechanism which is operable to effect an interchange of tools between a machine tool spindle and a tool storage magazine. A tool change arm is connected to a shaft on which there is secured a gear member. The gear member and a plurality of racks are actuatable by hydraulic actuators to impart the necessary rotational movement to the tool change arm and another hydraulic actuator is actuatable to effect the necessary translational movement to the tool change arm for effecting a tool interchange.

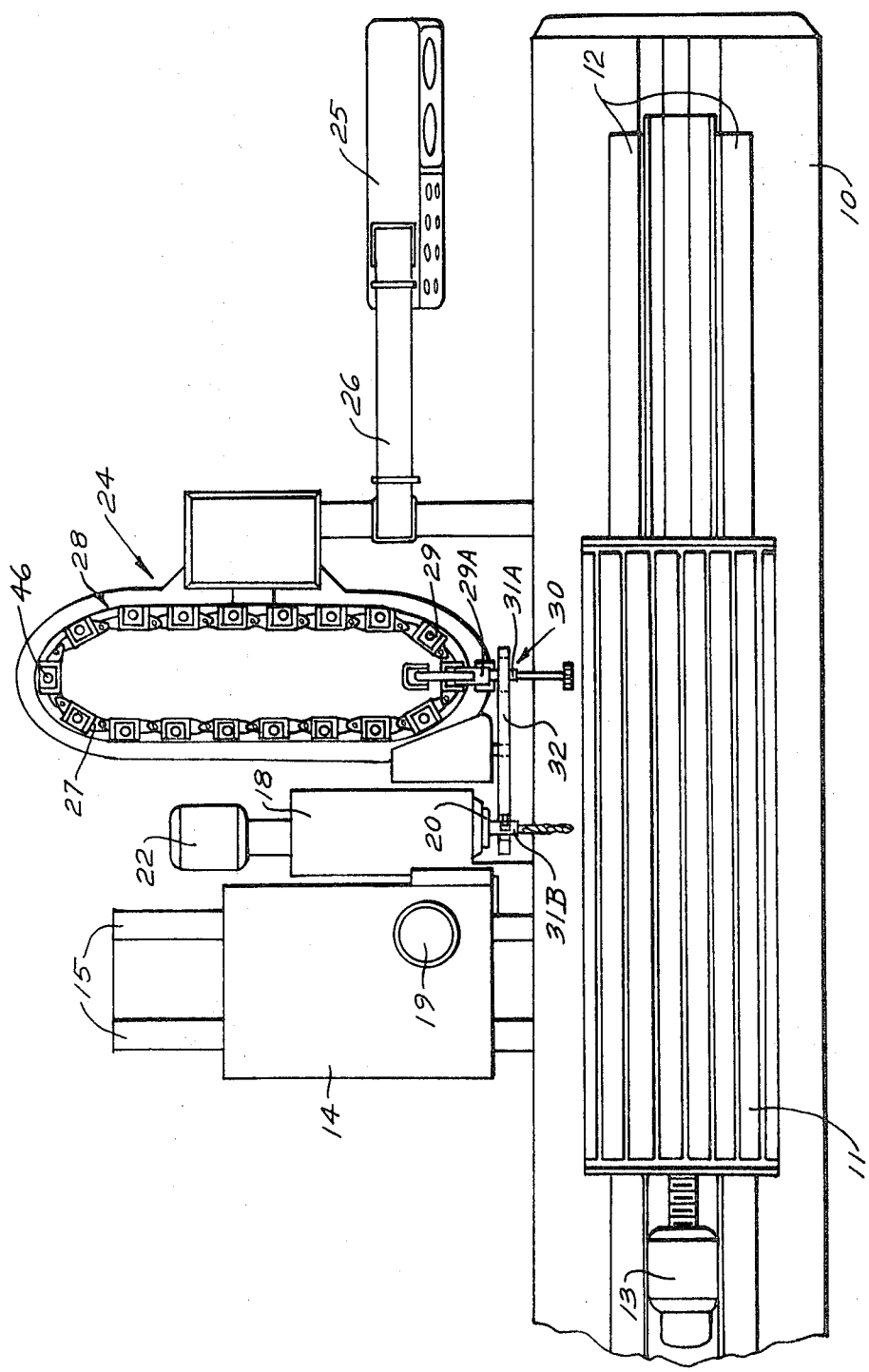

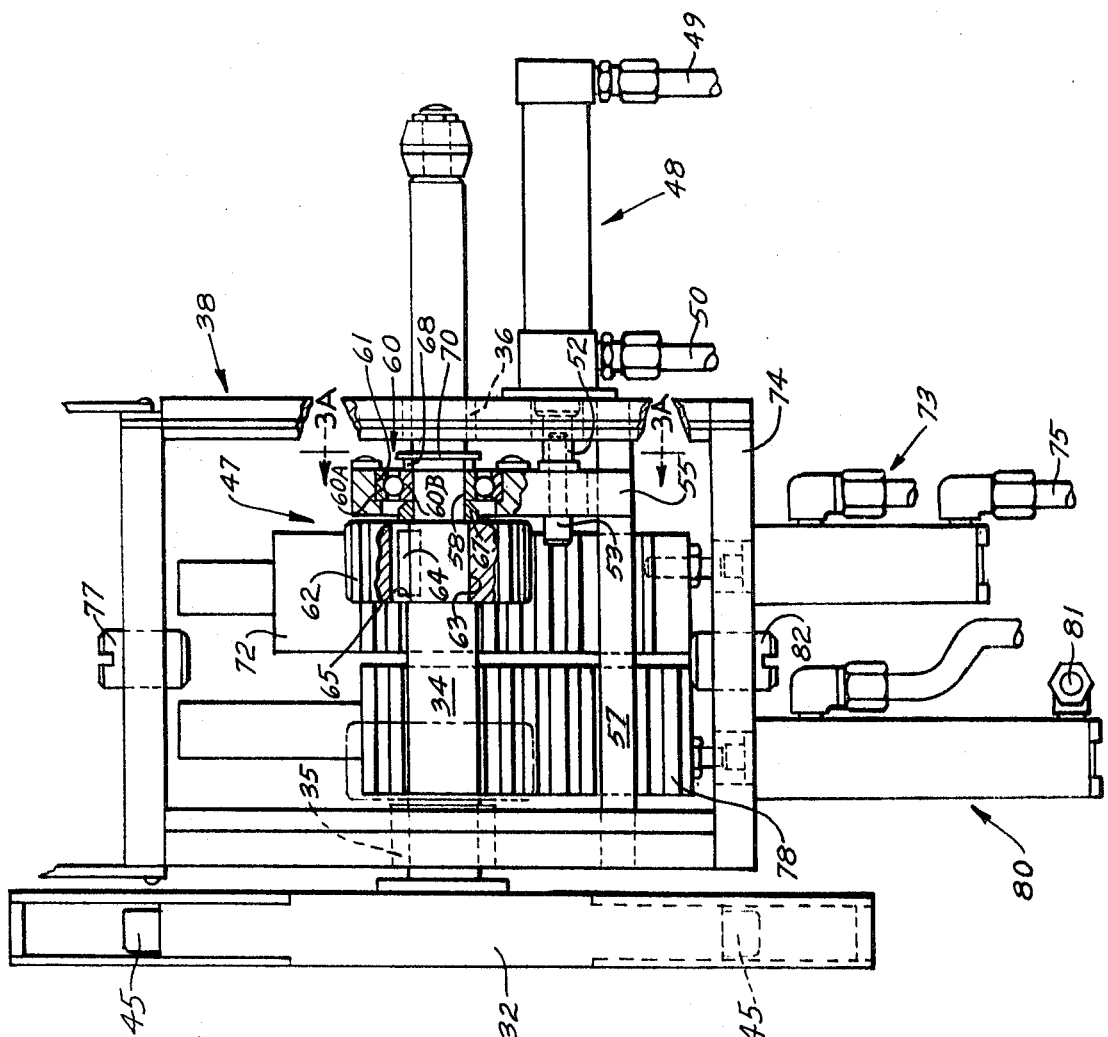

INVENTOR
EARL R. LOHNEIS
ATTORNEY
Thomas A. Hawke

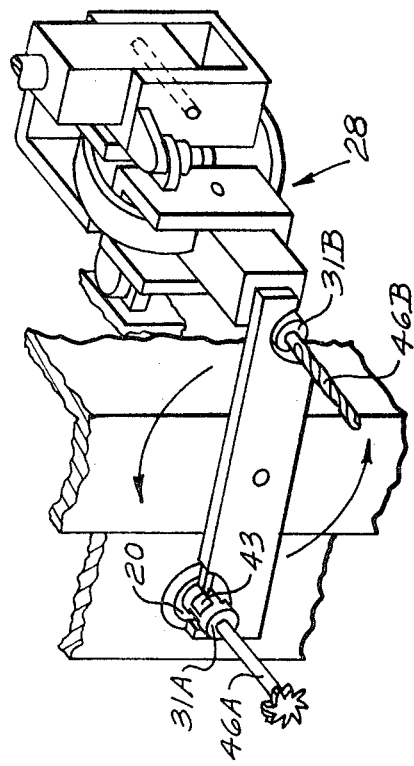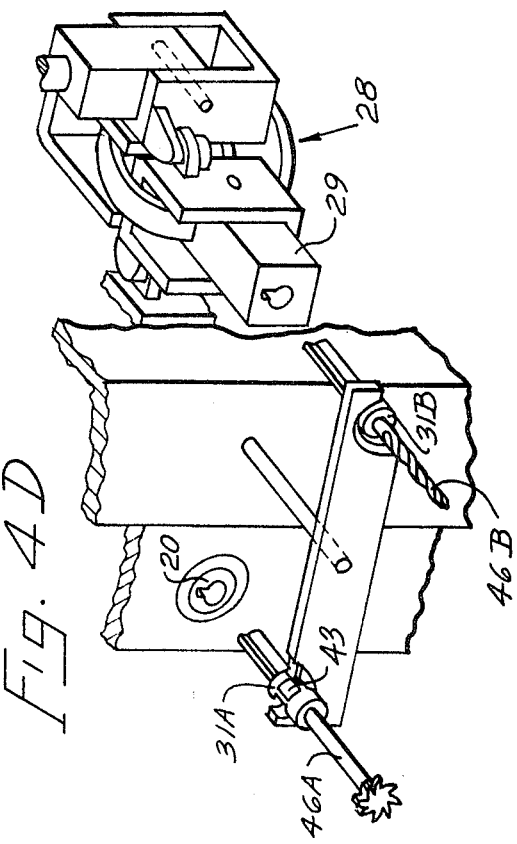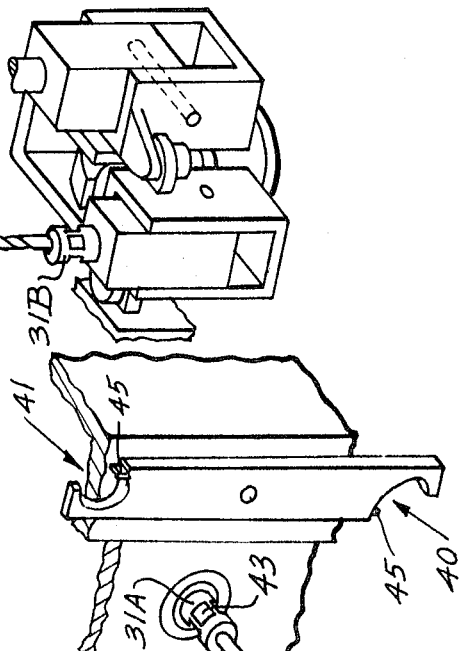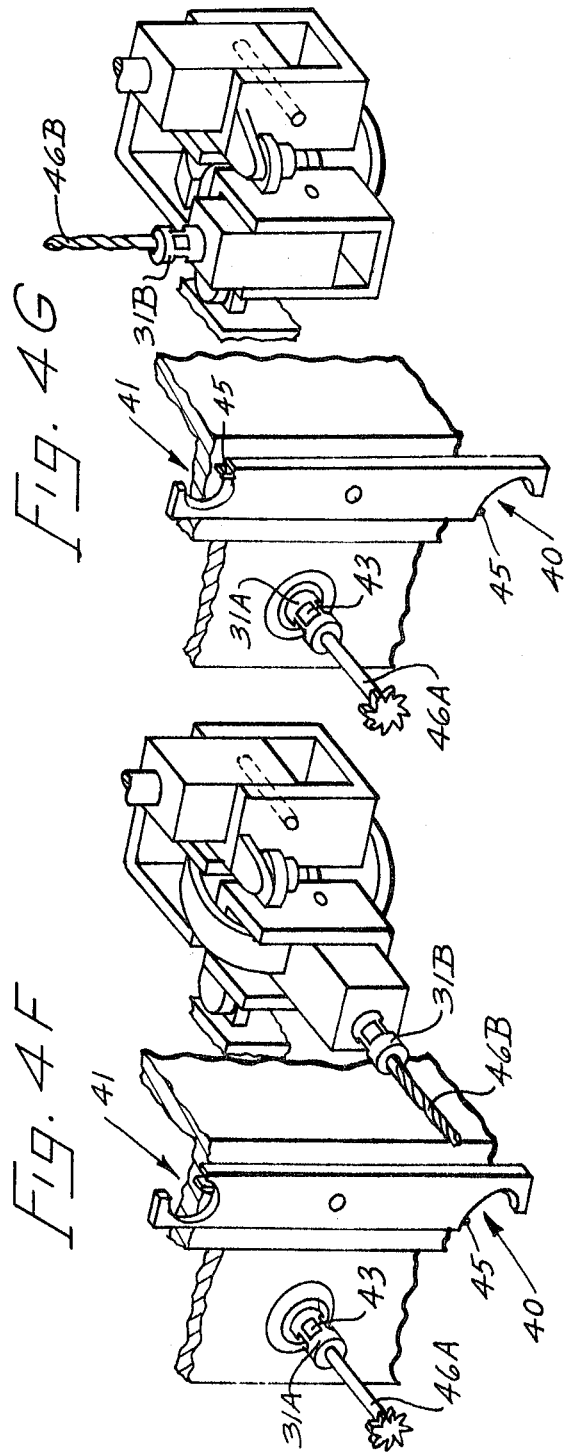
INVENTOR
EARL R. LOHNEIS
ATTORNEY
Thomas A. Hawke INVENTOR
EARL R. LOHNEIS
ATTORNEY
Thomas A. Hanke

FIG. 6.

| SEQ NO | ARM POSITION | FIG NO | SOL 84 Retract & Extend | SOL 85 180° Rack | SOL 86 90° Rack | SOL 87 Socket Pivot | SOL 88 Collet Clamp | 110 LS Socket Up | 111 LS Socket Down | 112 LS 90° Rack at 0° | 113 LS 90° Rack at 90° | 114 LS 180° Rack at 180° | 115 LS Tool Arm In | 116 LS Tool Arm Out | 117 LS Collet Unclamp |
|---|---|---|---|---|---|---|---|---|---|---|---|---|---|---|---|
| 0 | ARM IN AND AT 0° | 4 | 0 | 0 | 0 | 0 | 0 | 0 | 1 | 1 | 0 | 0 | 1 | 0 | 0 |
| 1 | ARM IN AND AT 0° AND SOCKET TILTED | 4A | 0 | 0 | 0 | 1 | 0 | 1 | 0 | 1 | 0 | 0 | 1 | 0 | 0 |
| 2 | ARM IN AND AT 90° CW | 4B | 0 | 0 | 1 | 1 | 0 | 1 | 0 | 0 | 1 | 0 | 1 | 0 | 0 |
| 3 | ARM IN AND AT 90° AND COLLET UNCLAMP |  | 0 | 0 | 1 | 1 | 1 | 1 | 0 | 0 | 1 | 0 | 1 | 0 | 1 |
| 4 | ARM OUT AND AT 90° CW | 4C | 1 | 0 | 1 | 1 | 1 | 1 | 0 | 0 | 1 | 0 | 0 | 1 | 1 |
| 5 | ARM OUT AND AT 270° CW | 4D | 1 | 1 | 1 | 1 | 1 | 0 | 1 | 0 | 0 | 1 | 0 | 1 | 1 |
| 6 | ARM IN AND AT 270° CW | 4E | 0 | 1 | 1 | 1 | 1 | 0 | 1 | 0 | 0 | 1 | 1 | 0 | 1 |
| 7 | ARM IN AND AT 270° AND COLLET CLAMP |  | 0 | 1 | 0 | 1 | 0 | 0 | 1 | 0 | 0 | 1 | 1 | 0 | 0 |
| 8 | ARM IN AND AT 180° CW | 4F | 0 | 0 | 0 | 0 | 0 | 1 | 0 | 1 | 0 | 0 | 1 | 0 | 0 |
| 9 | ARM IN AND AT 180° CW AND SOCKET UP | 4G | 0 | 0 | 0 | 0 | 0 | 0 | 0 | 1 | 0 | 0 | 1 | 0 | 0 |

INVENTOR
EARL R. LOHNEIS
ATTORNEY
Thomas A. Hawke

TOOL CHANGE MECHANISM FOR A MACHINE TOOL

BACKGROUND OF THE INVENTION

The present invention relates generally to machine tools and more particularly to a machine tool with a rotary spindle and having an improved tool-changing mechanism operative to replace a tool in the spindle.

Before this invention, tool changers used complex nonstandard hydraulic components to impart the necessary rotational movement to the tool change arm for effecting a tool interchange. As a result of the complex mechanism involved, tool changers have been costly items which often were difficult to adjust and maintain in working order. The present invention overcomes these problems by providing a tool changer that uses standard hydraulic components and a minimum of moving parts. In addition, adjust plugs are provided which allow the adjustment of the rotational travel of the tool change arm with a minimum of effort.

SUMMARY OF THE INVENTION

According to this invention, there is provided an improved tool change mechanism for a machine tool operable to effect an interchange of tools between the machine tool spindle and a tool storage magazine.

The tool change assembly includes a tool change arm having two grips which are engageable with toolholders carried by the magazine and the spindle. The tool change arm is carried by a rotary shaft which may also be shifted axially "in" and "out" by a hydraulic cylinder. A gear is fixed to the shaft so that it moves axially with the shaft. When the gear is "in" it is meshed with a rack that has a stroke corresponding to a 90° rotation of the arm. When the gear is moved to the "out" position, the gear is shifted from the 90° rack that has a stroke corresponding to a 180° rotation of the arm. The racks are actuated by hydraulic cylinders. The motion imparted by the racks to the tool change arm through the shaft-mounted gear provides the arm with the proper angular positions needed during a tool change cycle.

An object of the present invention is to provide a tool change arm assembly which is extremely accurate in its operation.

Another object of this invention is to provide a tool change arm assembly of compact, rigid and simple construction.

It is a further object of this invention to provide a tool change arm assembly using standard hydraulic components thereby effecting a substantial reduction in manufacturing and maintenance costs.

The foregoing and other objects of this invention, which will become more fully apparent from the following detailed description, may be achieved by the exemplifying apparatus depicted and set forth in the specification in connection with the accompanying drawings in which:

BRIEF DESCRIPTION OF THE DRAWINGS

FIG. 2 is a plan view of the machine tool shown in FIG. 1;

FIG. 3 is a view in side elevation of the tool changer assembly with an end plate removed to show the relationship of the tool change arm shaft, gear and gear racks;

FIG. 3A is a detail view in vertical section taken along the plane represented by the line 3A—3A in FIG. 3.

FIG. 6 is a logic table that shows the sequence of steps taken to perform a tool change.

DESCRIPTION OF THE PREFERRED EMBODIMENT

Figure 1:
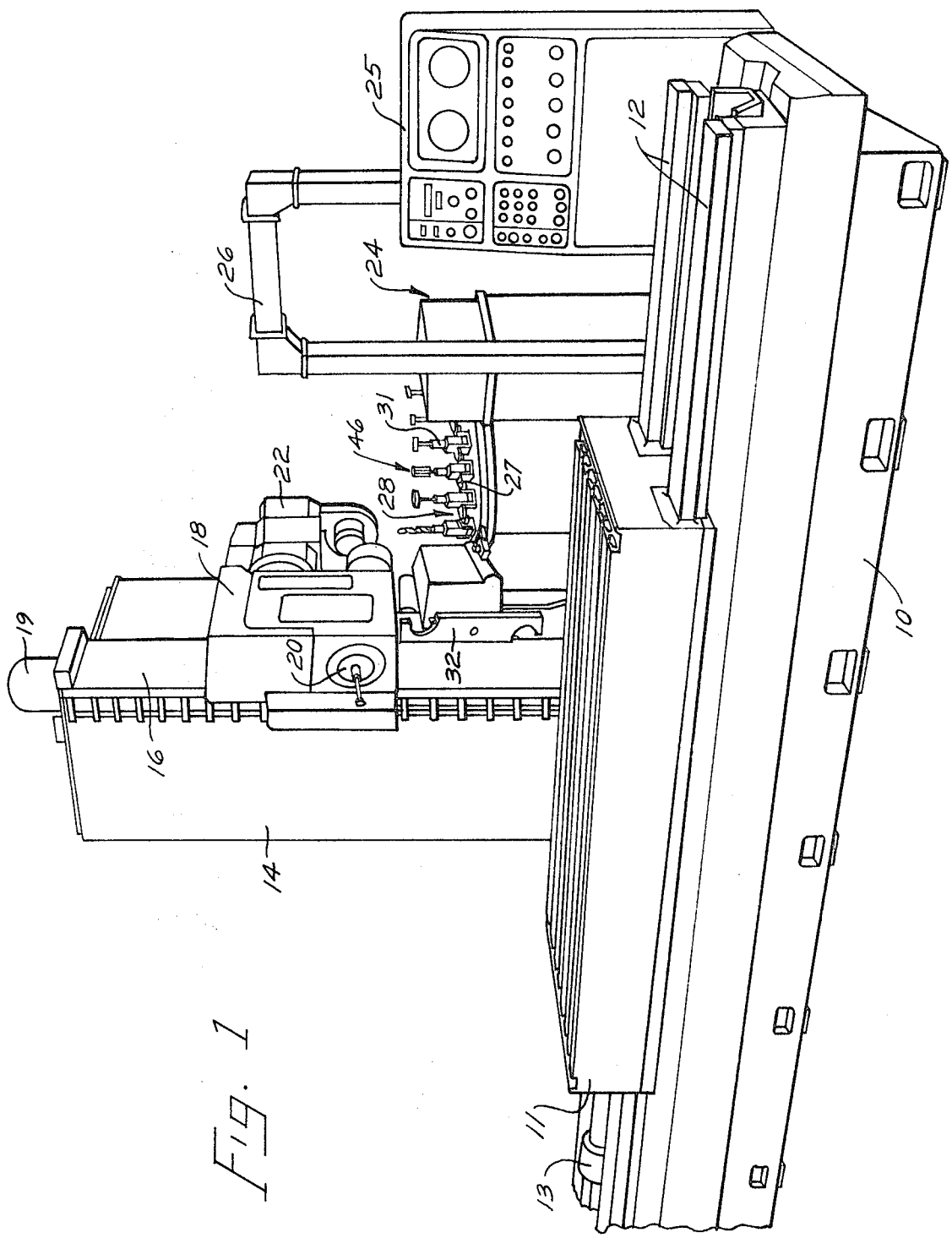
FIG. 1 is a perspective view of a machine tool incorporating the features of the present invention.

Reference is now made more particularly to the drawings and specifically to FIGS. 1 and 2 thereof, illustrating a machine tool incorporating the features of the present invention. The machine generally comprises a bed 10 which slidably supports a table 11. To this end, the bed 10 is provided with horizontal ways 12, which are engaged by complementary ways (not shown) formed on the bottom of table 11 to support the table for sliding movement along the length of the bed 10. Motor 13 is connected to drive the table 11 through a screwball nut mechanism (not shown) in a well-known manner.

An upstanding column 14 is provided with horizontal ways (not shown) formed on the bottom of column 14, which are engaged by complementary ways 15, formed on base 10 for slidably supporting column 14 in a cross-feeding movement in a horizontal path transverse to the direction of travel of the table 11. Column 14 is moved in its horizontal path of travel by a motor driving a screwball nut mechanism (not shown) in a well-known manner.

The column 14 is provided with vertical ways 16 for engagement by complementary ways (not shown) formed on a spindle head 18 for slidably supporting the spindle head 18 in a vertical path of travel. Vertical movement of the spindle head 18 in either direction is effected by a screwball nut mechanism (not shown) driven by a motor 19 in a well-known manner. It is therefore apparent that the table 11, the column 14, and the spindle head 18, are each supported for movement in three mutually transverse paths of travel. The spindle head 18 rotatably supports a spindle 20 that is adapted to carry a tool to rotate with the spindle 20 for performing a work operation. The spindle 20 is horizontally mounted within the spindle head 18.

The spindle 20 is driven in its rotary movement by a motor 22 under the control of a servomechanism (not shown) that is controlled automatically from recorded data or by manual manipulation of the electric control system. The motor 22 is connected to drive the spindle 20 through a transmission (not shown) in a well-known manner.

At the right top end of the bed 10, as viewed in FIG. 2, is an automatic tool changer and tool storage unit 24 which is a freestanding assembly that is not carried by the machine tool structure. It is connected to the machine control unit 25 by electrical conductors 26. The machine control unit 25 contains a tape reader which reads recorded data on punched tape in a well-known manner to provide the sequencing logic necessary to control the tool changer. The tool changer is operable to effect an interchange of tools between the tool spindle 20 and a tool storage magazine 28. As shown in FIGS. 1 and 2, a plurality of tools 46 are stored in the magazine 28. The tool storage magazine 28 is made up of a chain 27 that is mounted on a horizontal guide track. Each link of the chain 27 has a pivotable socket 29 mounted in it which contains a toolholder 31. When the toolholders are transported by the chain in a tool select indexing movement, the axis of each toolholder 31 is vertical. In order to effect a tool interchange between the tool magazine 28 and the tool spindle 20, the magazine 28 is indexed to advance a preselected tool to a tool change ready position, as indicated by general reference number 30. Also, the spindle head 18 must be positioned in the Y direction and the column 14 must be positioned in the Z direction before a tool exchange is started. The socket 29A containing the toolholder that has been selected for an exchange is pivoted downwardly 90° to a horizontal position at the tool change ready station 30 to render it accessible to a tool change arm 32. The axis of socket 29A will then be parallel to the axis of the machine spindle 20. FIG. 2 depicts the spindle head 18 moved to its tool change position with the tool change arm 32 engaged with a toolholder 31B located in the spindle 20 and another toolholder 31A in the socket 29A. The tool change arm 32 effects the simultaneous interchange of the tool from the spindle 20 with the tool from the socket 29A.

The tool change arm 32, as shown in FIG. 3, is secured to a horizontal shaft 34 which, in turn, is slidably and rotatably supported by bearings 35 and 36. Bearings 35 and 36 are housed in a supporting structure generally identified by the reference numeral 38. FIG. 3 illustrates the tool change arm 32 located in its parked vertical position out of the path of travel of the spindle head 18. When a tool change is to be effected, the tool change arm shaft 34 is pivoted in a vertical plane in a clockwise direction, as viewed in FIG. 1, to swing the tool change arm 32 from its parked position to its operating position as depicted in FIGS. 2 and 4B.

Figure 4A:
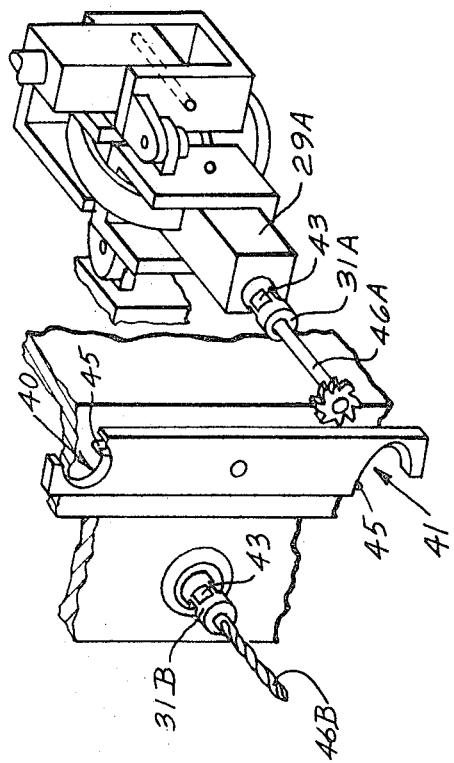
FIGS. 4 to 4G, inclusive, are a series of diagrammatic perspective views of the front of the spindle and magazine of the machine tool shown in FIG. 1, illustrating the various positions of the tool change arm during a tool change cycle.
Figure 4C:
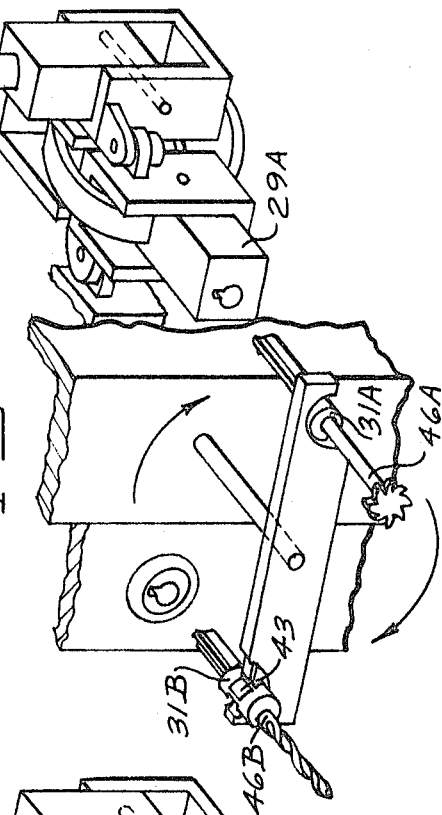
Figure 4:
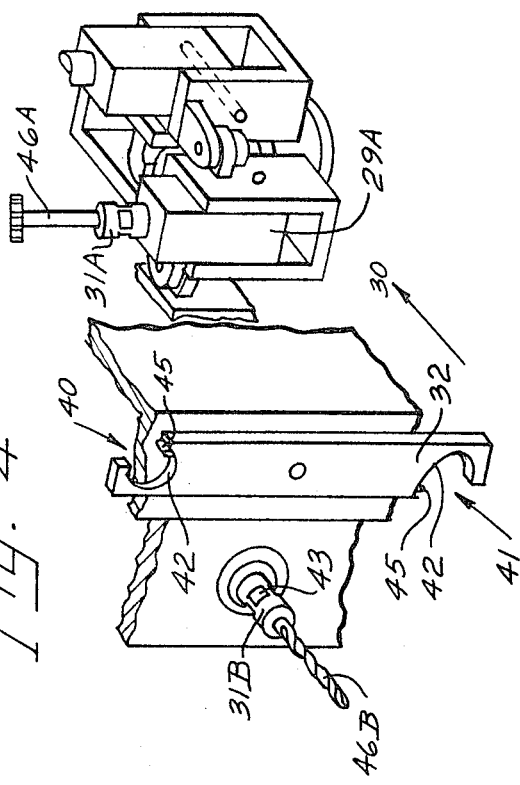

Tool grips 40 and 41 are provided on the ends of the tool change arm 32, as depicted in FIG. 4, and are each provided with a pair of substantially semicircular surfaces 42 for receiving a collar 43 secured to each toolholder. A spring urged roller 45 is included in the tool grips 40 and 41 for yieldably retaining the toolholders within the semicircular surfaces 42. Since the tool grips 40 and 41 per se are not a part of this invention as such, the precise mechanism for effecting the operation of the tool grips and associated rollers in a tool interchange cycle of operation has not been shown, nor is it described in detail herein. A more detailed description of the tool grips 40 and 41 may be had by referring to U.S. Pat. No. 3,348,298, filed on Aug. 10, 1961.

FIGS. 4 to 4G, inclusive, diagrammatically illustrate the cycle of operation of the tool change arm 32 in replacing a tool in the spindle 20. FIG. 4 shows the tool change arm 32 in its parked position with the tool storage magazine 28 stopped with a preselected tool 46A in a vertical position at the tool change station 30. In a response to a proper signal, the socket 29A containing the selected tool is pivoted outwardly of the magazine to render it accessible to the tool change arm, as depicted in FIG. 4A. In response to a proper signal, a rack and gear transmission, generally identified by the reference numeral 47 in FIG. 3 and housed within the supporting structure 38, is actuated to swing the tool change arm 32 in a clockwise direction to pivot the tool change arm 32 from its parked position to its operative position, as illustrated in FIG. 4B. Such rotation moves the tool change arm 32 to a position wherein the grip 40 is in engagement with the toolholder 31A containing a tool 46A as extending from the magazine 28 and the grip 41 is in engagement with the toolholder 31B containing a tool 46B that is carried by the spindle 20. It will be observed that the tool 46A extending from the magazine 28 is a milling cutter and the tool 46B located in the spindle 20 is a drill, and the illustrated cycle shows the tool change arm 32 replacing the drill 46B in the spindle 20 by the milling cutter 46A.

Figure 4B:
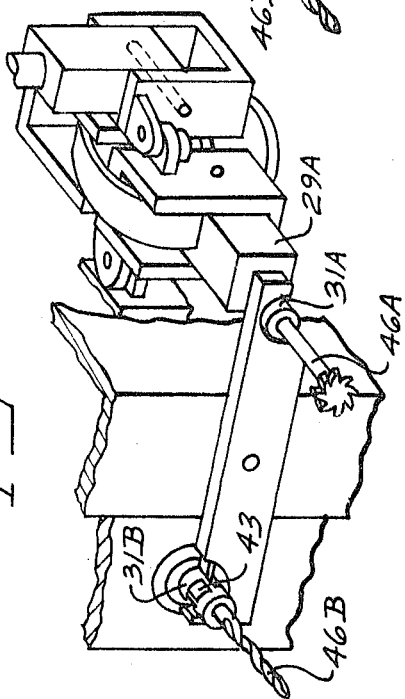

With the tool change arm 32 positioned as depicted in FIG. 4B, the grips 40 and 41 have grasped the two tools for the purpose of withdrawing them from the spindle 20 and from the magazine 28. The tool change arm 32 is moved axially in a forward direction by a hydraulic unit (not shown) and the two tools move with it out of the spindle 20 and the magazine 28 to the position depicted in FIG. 4C.

After the two tools have been extracted from the spindle 20 and the magazine 28, the tool change arm 32 is rotated 180° in a clockwise direction, as viewed from the front of the machine and as indicated by the arrows in FIG. 4C, to the position depicted in FIG. 4D. Such rotation of the tool change arm 32 by the gear and rack transmission 47 functions to move the drill 46B from alignment with the spindle 20, into alignment with the magazine 28, and the milling cutter 46A has been moved from alignment with the magazine 28, into alignment with the spindle 20. After the drill 46B and the milling cutter 46A have been interchanged by one-half of a revolution of the tool change arm 32, the latter will be retracted by a hydraulic unit 48 towards the machine, to insert the two tools into the spindle 20 and the magazine 28, respectively, as illustrated in FIG. 4E, so that the milling cutter 46A is inserted in the spindle 20 and the drill 46B is moved into the magazine 28.

From the position shown in FIG. 4E, the tool change arm 32 is moved in a counterclockwise direction, as indicated by the arrows in FIG. 4E, to the position depicted in FIG. 4F. In this position, the tool change arm is located 180° from its position at the start of the tool change cycle and the tool grips 40 and 41 have been transposed. The grips 40 and 41 are thus moved out of engagement with the respective tools and the tool change has been completed, the drill 46B has been replaced in the spindle 20 by the selected milling cutter 46A. The socket now containing the drill 46B is pivoted upwardly into a vertical position as depicted in FIG. 4G. The tool storage magazine may then be operated in a manner for selecting the succeeding tool which is to be placed in the spindle 20 by the tool change arm 32.

As shown in FIG. 2, the magazine 28 is free standing from the machine tool. The construction and operation of the magazine are not per se part of this invention as such and will not be described in detail herein.

The sequential movements of the tool change arm 32 for completing a tool change operation, as described in conjunction with the views illustrated in FIGS. 4 to 4G, are produced by the improved actuating mechanism shown in FIG. 3. Translational movement of the tool change arm 32 for extending and retracting it, is effected by the piston-cylinder mechanism 48 which is operatively mounted on the right side of supporting structure 38, as shown in FIG. 3. Fluid pressure in the conduit 49 will move a piston rod 52 of piston-cylinder mechanism 48 in a leftward direction, as viewed in FIG. 4B, to move the arm 32 to its extended position, as depicted in FIG. 4C. Fluid pressure in conduit 50 will move the piston rod 52 in a rightward direction, as viewed in FIG. 4C, to move arm 32 to its retracted position, as viewed in FIG. 4B.

The piston rod 52 is connected by a screw 53 to a guide plate 55 which, in turn, is attached to a reduced portion 58 of shaft 34 by a bearing assembly indicated generally by the reference numeral 60. Guide plate 55 has a slot 56 cut in it, as shown in FIG. 3A, which slidably engages a guide rod 57 that is fixedly secured in a horizontal position to the supporting structure 38. An outer race 60A of bearing assembly 60 is engaged in a groove 61 formed in the interior surfaces of guide plate 55. An inner race 60B is in engagement with the reduced shaft portion 58. The reduced portion 58 of shaft 34 and the guide plate 55 are separated by the bearing itself. Therefore, the shaft 34 will be allowed to turn while the guide plate 55 remains stationary. A gear 62 is carried on a reduced portion 63 of shaft 34 and is secured to rotate with the shaft 34 by operation of a key 64. Gear 62 is disposed in abutting engagement with a radial shoulder 65 of shaft 34 and is prevented from shifting axially relative to the shaft 34 by a retainer washer 67 which, in turn, is in abutting engagement with the inner race of the bearing assembly 60. The inner race of bearing 60 is engaged by a spacer washer 68 and the entire assembly is retained in operable position by a snap ring 70.

When the tool change arm shaft 34 is in the "in" or retracted position, as depicted in FIG. 3, gear 62 is in mesh with a gear rack 72 that has a stroke corresponding to a 90° rotation of shaft 34. Rack 72 is detachably connected to be actuated by a piston-cylinder mechanism 73 which is operatively mounted on the bottom plate 74 of the supporting structure 38. Fluid pressure in conduit 75 will serve to actuate the piston-cylinder mechanism 73 for moving its associated rack 72 until the rack comes to rest against a top adjust plug 77. The movement of rack 72 will rotate meshed gear 62 to impart a 90° rotation to shaft 34 and consequently a 90° rotation to its associated tool change arm 32, as depicted in FIG. 4B.

When the tool change arm 32 is moved to its "out" or extended position, as depicted in FIG. 4C, gear 62 is shifted axially from the 90° rack 72 to a second gear rack 78 that has a stroke which produces 180° rotation of arm 32. The gear teeth of racks 72 and 78 are arranged so that they will be in alignment when the racks are located in their limits of movement as established by the cooperating stops 77 and 82. Rack 78 is actuated by a piston-cylinder mechanism 80 which is operatively mounted on the bottom plate 74 of supporting structure 38. Fluid pressure in conduit 81 will move the piston 102 in an upward direction, as viewed in FIGS. 3 and 5, to move attached rack 78 into abutment with the adjust plug 77. Rack 78 will rotate meshed gear 62 to impart a 180° rotation to shaft 34 and consequently a 180° rotation to its associated tool change arm 32 to move the arm from the position depicted in FIG. 4C to the position depicted in FIG. 4D. The movement of the 180° rack 78 will cause the tool change arm to rotate for interchanging the position of the tools 46A and 46B. The bottom adjust plug 82 sets the lower limit of travel of the racks 72 and 78. By changing the limits of the adjust plugs 77 and 82, the amount of rotational travel of the tool change arm 32 can be adjusted to correct for any small manufacturing or alignment errors that could occur. The piston-cylinder mechanisms 48, 73 and 80 are all standard hydraulic components. As shown in FIG. 3, the rack and gear transmission 47 is comprised of rigid and simple construction, and along with its associated piston-cylinder mechanisms, takes up a minimum of space.

Figure 5:
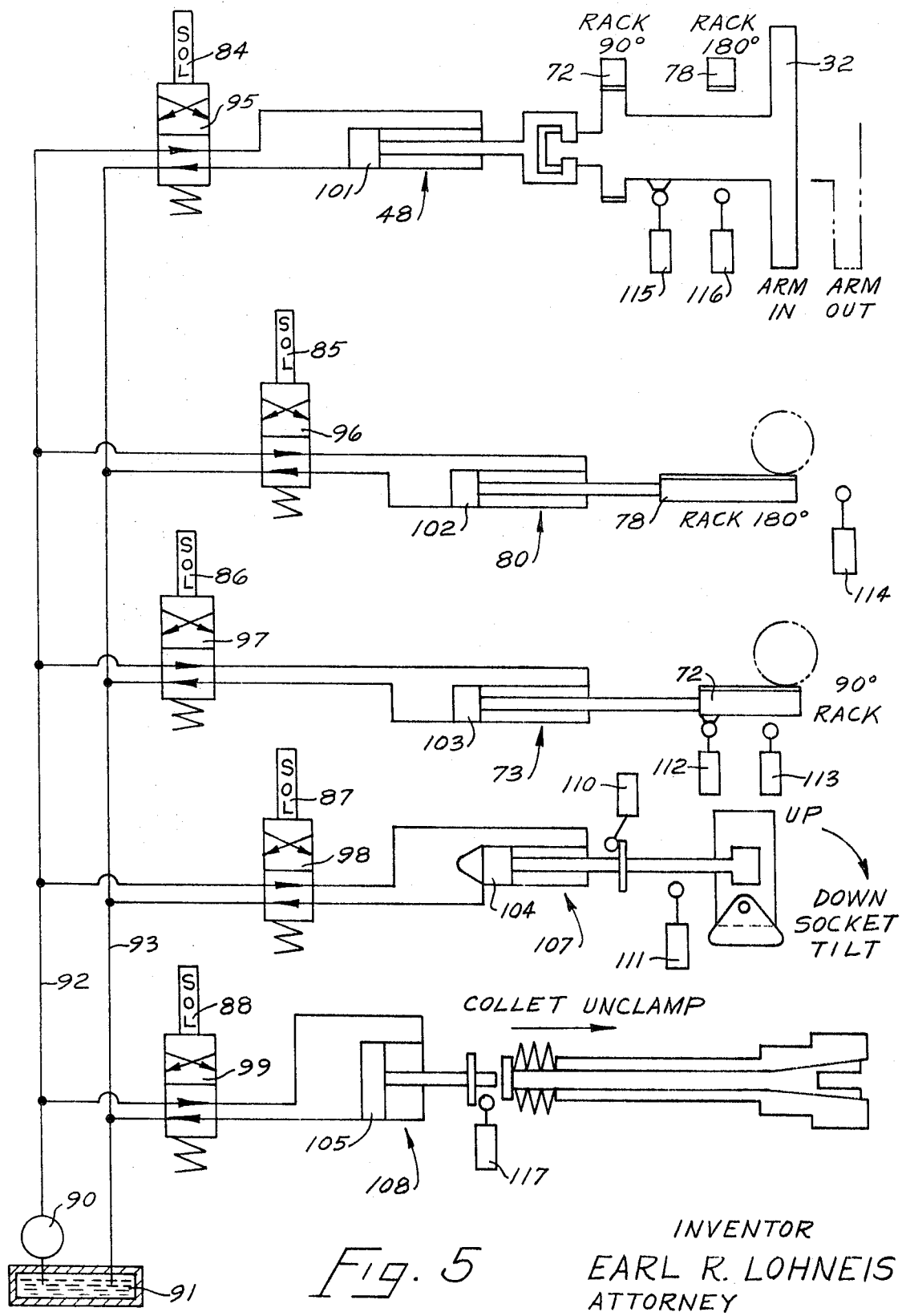
FIG. 5 is a diagrammatic view of the hydraulic circuit.

The hydraulic circuit for driving the various components described is illustrated diagrammatically in FIG. 5 and comprises a pump 90 connected to draw hydraulic fluid from a reservoir 91. The output of the pump 90 is discharged into a pressure line 92 with the exhaust fluid being carried back to the reservoir by return line 93. Hydraulic pressure from the line 92 is directed to the piston-cylinder mechanism 48 for holding the tool arm 32 in a retracted position. Energization of solenoid 84 will actuate valve 95 to connect the pressure line 92 to the head side of piston 101 effecting the outward, extended movement of the tool change arm 32. When solenoid 84 is deenergized, the valve will spring return to the position shown in FIG. 5, where the pressure line is connected to the rod side of piston 101, thereby causing the tool change arm to move to its retracted position.

Hydraulic pressure from line 92 is directed to the piston-cylinder mechanism 80 for holding the 180° rack 78 in a downward position, as depicted in FIG. 3. Energization of solenoid 85 will actuate valve 96 to connect the pressure line 92 to the head side of piston 102 effecting the upward stroke of rack 78. When solenoid 85 is deenergized, the valve 96 will spring return to the piston shown in FIG. 5 where the pressure line is connected to the rod side of piston 102 and thereby effecting the downward stroke of rack 78.

Hydraulic pressure from line 92 is directed to the piston-cylinder mechanism 73 for holding the 90° rack 72 in a downward position, as depicted in FIG. 3. Energization of solenoid 86 will actuate valve 97 to connect the pressure line 92 to the head side of piston 103 effecting the upward stroke of rack 72. When solenoid 86 is deenergized, the valve 97 will spring return to the position shown in FIG. 5, where the pressure line is connected to the rod side of piston 103, thereby effecting the downward stroke of rack 72.

Hydraulic pressure from line 92 is directed to the piston-cylinder mechanism 107 for positioning the socket at the tool change ready station 30 in a vertical position, as depicted in FIG. 4. Energization of solenoid 87 will actuate valve 98 to connect the pressure line 92 to the head side of position 104 effecting the socket to move to its horizontal position, as depicted in FIG. 4A. When solenoid 87 is deenergized, the valve 98 will spring return to the position shown in FIG. 5, where the pressure line is connected to the rod side of piston 104, thereby effecting the upward pivot of the socket to its vertical position.

Hydraulic pressure from line 92 is directed to the piston-cylinder mechanism 108 for clamping the spindle collet to hold a tool in the spindle. Energization of solenoid 88 will actuate valve 99 to connect the pressure line 92 to the head side of piston 105 effecting the collet to release the tool within the spindle. When solenoid 88 is deenergized, the valve 99 will spring return to the position shown in FIG. 5, where the pressure line is connected to the rod side of piston 105, thereby effecting the clamping of the collet on the tool held within the spindle.

A description of a tool change cycle of operation will be described in conjunction with FIG. 6, which depicts a logic sequence chart describing the various conditions of the solenoids and limit switches which control the sequencing of the tool change cycle. It will be assumed that the various mechanisms are in the condition depicted in FIG. 4, which corresponds to sequence No. 0 on the logic sequence chart wherein the tool change arm 32 is in its retracted, parked position, the socket 29A with a preselected tool is in its vertical position at the tool change ready station 30, and the spindle head 18 is at the corrected vertical and horizontal positions for a tool change. With these conditions obtained, solenoids 84, 85, 86, 87 and 88 will be deenergized and limit switches 111, 113, 114 and 116 will be deactuated as depicted by zeros in the logic chart in FIG. 6.

Limit switch 110, which is actuated by the socket at the tool ready station 30 being in a vertical position, limit switch 112, which is actuated when 90° rack 72 is against the bottom stop plug 82 as shown in FIG. 3, and limit switch 115, which is actuated when the tool change arm 32 is in its "in" or retracted position, are indicated as being actuated by the numeral 1 in the appropriate square of the logic chart in FIG. 6. A signal from the tape will now energize solenoid 87 to effect the pivoting of the socket containing the preselected tool 90 downwardly to a horizontal position at the tool change ready station 30, as depicted in FIG. 4A and corresponding to sequence No. 1 of the logic sequence chart. The downward pivoting of the socket will actuate limit switch 111.

Limit switch 111, when actuated, will effect the energizing of solenoid 86 which, in turn, will effect the upward movement of the 90° rack 72 to effect the operation of the tool change arm 32 from its parked position to its operating position, as depicted in FIG. 4B and corresponding to sequence No. 2 of the logic sequence chart. The upward movement of 90° rack 72 will actuate limit switch 113.

Limit switch 113, when actuated, will effect the energizing of solenoid 88 for operating the collet mechanism in a well-known manner to release the tool 46B in the spindle 20. Releasing the tool in the spindle occurs during sequence No. 3 of the logic chart. The releasing of the collet will actuate limit switch 117.

Limit switch 117, when actuated, will effect the energizing of solenoid 84 to effect the extension of tool change arm 32 to its "out" or extended position, as depicted in FIG. 4C corresponding to sequence No. 4 of the logic sequence chart. The outward movement of the tool change arm 32 will actuate limit switch 116.

Limit switch 116, when actuated, will effect the energization of solenoid 85 which, in turn, will effect the upward movement of the 180° rack 78 to effect the operation of the tool change arm 32 in a clockwise direction, and as indicated by the arrows in FIG. 4C, to the position depicted in FIG. 4D and corresponding to sequence No. 5 of the logic sequence chart. The upward movement of the 180° rack 78 will actuate limit switch 114.

Limit switch 114, when actuated, will effect the deenergization of solenoid 84 which, in turn, will return the tool change arm 32 to its "in" or retracted position, as depicted in FIG. 4E and corresponding to sequence No. 6 of the logic sequence chart. The inward movement of the tool change arm 32 will actuate limit switch 115.

Limit switch 115, when actuated, will effect the deenergization of solenoid 88 for effecting the operation of the collet mechanism to secure the tool in the spindle 20 in a well-known manner. The operation of securing the tool in the spindle corresponds to sequence No. 7 of the logic sequence chart. The clamping of the collet will deactuate limit switch 117.

Limits switch 117, when deactuated, will effect the deenergization of solenoid 86 for producing the downward movement of the 90° rack 72 to cause rotation of the tool change arm 32 in a counterclockwise direction, as indicated by the arrows in FIG. 4E to the position depicted in FIG. 4F and corresponding to sequence No. 8 of the logic sequence chart. Also at this time, solenoid 85 becomes deenergized so that the 180° rack 78 will be reset for the next tool exchange sequence.

The downward movement of the 90° rack 72 will effect the deenergization of solenoid 87 to produce the upward pivot of the socket to its vertical position to the position depicted in FIG. 4G and corresponding to sequence No. 9 of the logic sequence chart. The tool storage magazine may now be operated by the control unit 25 in a manner fore selecting the succeeding tool which is to be placed in spindle 20 by the tool change arm 32.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the subjoined claims.

I claim:
1. In a tool change mechanism for interchanging tools between a tool storage magazine and the work station of a machine tool;
   a frame;
   a tool change arm carried by said frame;
   a first gear means mounted in said frame;
   a pinion engageable with said first gear means and connected with said tool change arm so that movement of said first gear means will cause a rotary movement of said pinion, said pinion being connected to said tool change arm so that rotary movement of said pinion produces a rotary movement of said tool change arm;
   a first shifting means connected to shift said first gear means in its path of travel for producing a first rotary movement of said tool change arm in its tool change cycle;
   a second gear means mounted in said frame;
   a second shifting means connected to shift said second gear means in its path of travel for producing a second rotary movement of said tool change arm in its tool change cycle; and,
   coupling means operable to effect movement of said pinion to engageably mesh said pinion with either the first or second gear means selectively.

2. In a tool change mechanism according to claim 1 wherein said coupling means and said first and second shifting means are hydraulic piston and cylinder mechanisms.

3. In a tool change mechanism according to claim 1 including adjusting means operable to regulate the amount of movement of said first and second gear means.

4. In a tool change mechanism according to claim 3 wherein said adjusting means is adjustable from outside said frame.